(12) United States Patent
Lai et al.

(10) Patent No.: US 9,223,164 B2
(45) Date of Patent: Dec. 29, 2015

(54) DISPLAY

(71) Applicant: SiPix Technology, Inc., Taoyuan (TW)

(72) Inventors: Cheng-Yuan Lai, Taipei (TW); Hui Chen, Fremont, CA (US); Jung-An Cheng, Kaohsiung (TW); Wei-Ho Ting, Taichung (TW); Yu Li, Fremont, CA (US); Hongmei Zang, Fremont, CA (US); Ming Wang, Fremont, CA (US); Zoran Topalovic, San Jose, CA (US); Tyau-Jeen Lin, Taipei (TW)

(73) Assignee: SiPix Technology, Inc., Kueishan, Taoyuan (TW)

( * ) Notice: Subject to any disclaimer, the term of this patent is extended or adjusted under 35 U.S.C. 154(b) by 95 days.

(21) Appl. No.: 13/957,447

(22) Filed: Aug. 2, 2013

(65) Prior Publication Data

US 2015/0036206 A1   Feb. 5, 2015

(51) Int. Cl.
*G02B 26/00* (2006.01)
*G09G 3/34* (2006.01)
*G02F 1/1333* (2006.01)
*G02F 1/167* (2006.01)
*G02F 1/17* (2006.01)

(52) U.S. Cl.
CPC .......... *G02F 1/133377* (2013.01); *G02F 1/167* (2013.01); *G02F 1/133348* (2013.01); *G02F 1/172* (2013.01); *G02F 2001/1672* (2013.01); *G02F 2001/1678* (2013.01); *G02F 2202/36* (2013.01); *G09G 3/344* (2013.01); *G09G 2320/0252* (2013.01); *G09G 2320/041* (2013.01)

(58) Field of Classification Search
CPC ............ G02F 1/167; G02F 2001/1678; G02F 2001/1672; G02F 1/133348; G02F 1/172; G02F 2202/36; G09G 3/344; G09G 2320/0252; G09G 2320/041
USPC .............................. 359/296; 345/71, 107, 214
See application file for complete search history.

(56) References Cited

U.S. PATENT DOCUMENTS

| 7,349,148 | B2 | 3/2008 | Doshi | |
|---|---|---|---|---|
| 2007/0097489 | A1 | 5/2007 | Doshi | |
| 2008/0085369 | A1* | 4/2008 | Cai et al. | 427/379 |
| 2011/0026101 | A1 | 2/2011 | Wu | |
| 2011/0116157 | A1 | 5/2011 | Wei | |
| 2011/0157682 | A1* | 6/2011 | Zang et al. | 359/296 |

FOREIGN PATENT DOCUMENTS

| JP | 2007510956 | 4/2007 |
|---|---|---|
| TW | 201042348 | 12/2010 |
| TW | 201205176 | 2/2012 |

* cited by examiner

*Primary Examiner* — Evelyn A Lester
(74) *Attorney, Agent, or Firm* — Winston Hsu; Scott Margo

(57) ABSTRACT

A display includes a display medium layer and a dielectric layer disposed at a side of the display medium layer. The composition of the dielectric layer includes at least a humectant for decreasing the electric resistivity of the dielectric layer and stabilizing the electric performance of the display.

11 Claims, 1 Drawing Sheet

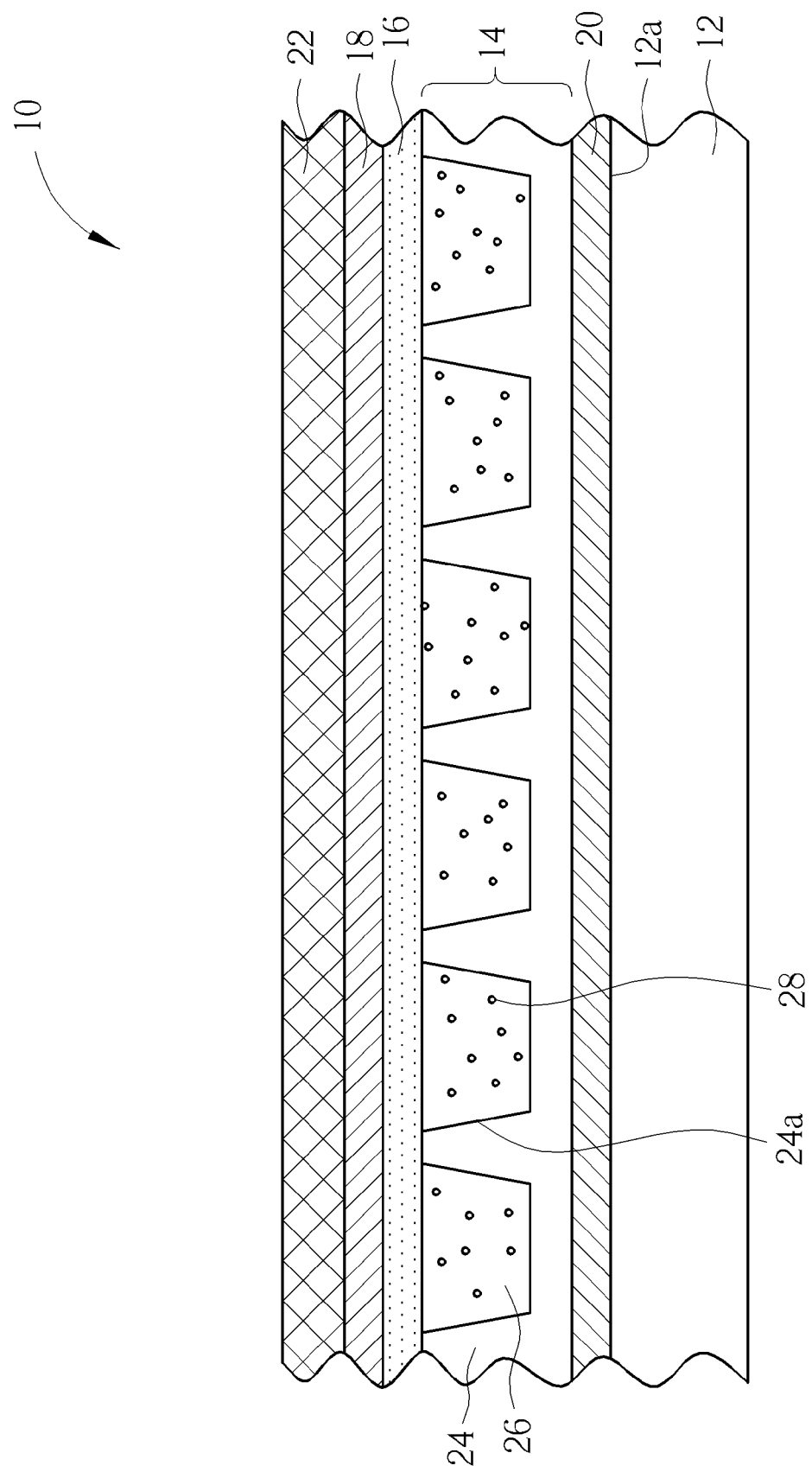

DISPLAY

BACKGROUND OF THE INVENTION

1. Field of the Invention

The present invention is related to a display, and more particularly, to a display including a dielectric layer with a humectant additive.

2. Description of the Prior Art

As flat displays have advantages of small volume and light weight, they are applied in various electrical products. The displaying theory for some flat displays, such as liquid crystal displays (LCD) and electrophoresis display (EPD), includes applying a voltage difference or an electric filed by a top electrode and a bottom electrode to the display medium of the flat display, so as to drive the display medium to display images.

In the flat display, at least one dielectric layer may be located within the displaying electric field that applied by the top and bottom electrodes. Therefore, the dielectric layer will share the applied voltage. In order to achieve the best function of the display, the resistivity of the dielectric layer should be as low as possible, in order to apply enough electric field across the display medium for giving the highest contrast and fastest imaging update speed. However, the electrical properties of the dielectric layers of the flat display are normally various according to the environmental temperatures and moistures, which affect the electrical performance of the flat display. One of the main factors dominating this instability is referring to the moisture level contained within the dielectric layer which is located within the displaying electric field. For example, the moisture level of the dielectric layer would be lower at higher temperature, which causes shifting of the electric resistance of the dielectric layer. And the moisture out of from the dielectric layer would penetrate the electric elements or the display medium, which raise their resistivities. On the other hand, the penetrated moisture may be frozen when the ambient temperature is down to 0° C., which may also induce inappropriate resistance and impact the optical performance as well.

Many conductive fillers, such as conductive nanoparticles, carbon nanotubes, carbon blacks, metal particles an so on, are used to reduce the resistivity for achieving better display performance. However, it is really a challenge to have uniform distribution of the conductive fillers in the polymer matrix. Extra dispersing or process needs to be introduced and the long term stability of the polymer composite fluid is also a concern. Another type of conductive materials that can be used to low down the resistivity is conducting polymer. However, conducting polymers normally need a doping chemical to maintain the polymer at conductive state. However, the compatibility and stability of the doping chemicals bring further complexity to the application. In addition, conducting polymers usually have high cost.

As a result, to provide a display with a stable electrical performance or to maintain the electrical properties of the dielectric layers of the display is still an important issue for the manufactures of displays.

SUMMARY OF THE INVENTION

It is one of the objectives of the present invention to provide a display including a dielectric layer with stable electrical property.

According to the claimed present invention, a display is provided. The display comprises a display medium layer and a dielectric layer which is disposed at a side of the display medium layer. The composition of the dielectric layer comprises at least a humectant.

The humectant is used as an additive in the composition of the dielectric layer, such that the moisture is maintained or locked in the dielectric layer. Therefore, the electrical property of the dielectric layer can be constant, and the resistivity of the other electric elements or display medium and the bulk resistivity distribution of the display will not be affected, so as to provide a stable performance of the display.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The FIGURE is a schematic sectional diagram of a display according to an embodiment of the present invention.

DETAILED DESCRIPTION

Please refer to the FIGURE. The FIGURE is a schematic sectional diagram of a display according to an embodiment of the present invention. The display 10 of the present invention includes at least a substrate 12 and a display medium layer 14 positioned on a side of the substrate 12. The display 10 may be any kind of flat display, such as a liquid crystal displays (LCD) or an electrophoresis display (EPD). In this embodiment, EPD is taking as an example for the display 10. As a result, the display medium layer 14 includes an electrophoretic medium layer, which may include a fluid 26 and charged particles 28, but not limited thereto. In various embodiments, the display medium layer 14 may include a microcapsule layer, a quick-response liquid powder layer, or a twisting ball layer, for instance. In addition, in this embodiment, the display 10 may include a plurality of micro-cup structures 24 arranged as a matrix on the surface 12a of the substrate 12. The micro-cup structures 24 are formed with dielectric material, and each micro-cup structure 24 has a containing space 24a used for containing the electrophoretic medium. Therefore, the micro-cup structures 24 are disposed within the display medium layer 14. The display 10 further includes at least two dielectric layers, wherein one is a sealing layer 16 disposed on the display medium layer 14, and the other one is an adhesive layer 18 disposed on the sealing layer 16. The sealing layer 16 is used for sealing the electrophoretic medium within the micro-cup structures 24. The adhesive layer 18 is used to attach a control element layer 22 to the sealing layer 16 and the display medium layer 14. Therefore, both the adhesive layer 18 and the sealing layer 16 are disposed at a side of the display medium layer 14 opposite to the substrate 12. The control element layer 22 may include transparent conductive material, such as indium tin oxide (ITO) and indium zinc oxide (IZO), and transistors arranged as an array, so as to provide operation voltages to the display 10. In addition, a conductive layer 20 may be disposed between the substrate 12 and the display medium layer 14, wherein the conductive layer 20 includes a conductive material, such as ITO, IZO, and metal. The control element layer 22 and the conductive layer 20 serve as the top electrode and the bottom electrode of the display 10 respectively. Under operation, the voltage difference or electric field occurs between the control element layer 22 and the conductive layer 20 forces the charged particles 28 of the display medium layer 14 to move upward or downward for displaying images. In various embodiments, the locations of the conductive layer 20 and the control element layer 22 can be replaced with each other, which means the conductive layer may be disposed on the sealing layer 18 and the control element layer may be disposed between the display medium layer 14 and the substrate 12. Furthermore, the display 10 may selectively include a barrier layer or a passivation layer (not shown) disposed on the control element layer.

In order to prevent the moisture from being dried out from the dielectric layers, such as the sealing layer 16, the adhesive layer 18, and the micro-cup structures 24, the present invention provides a solution to add an additive in the material or composition of at least one of the sealing layer 16, the adhesive layer 18 and the micro-cup structures 24. For shortening the description, the term "dielectric layer" represents at least one of the sealing layer 16, the adhesive layer 18 and the micro-cup structures 24 in the following. The additive of the composition of the dielectric layer includes a humectant for maintaining the moisture level of the dielectric layer in order to keep the stable electrical property. In one aspect, the humectant includes small molecules with high polar group density. Preferably, the molecular weights of the small molecules of the humectant are less than about 1000, wherein the term "molecular weight" mentioned in the disclosure represents the relative molecular mass known by the skilled person in the art. More preferably, the molecular weights of the small molecules of the humectant are in a range from about 50 to about 200. The humectant may be any kind of small molecules that are widely used in different industries and readily available. Due to the small size of the molecules, they can be easily and homogenously mixed into the composition of the dielectric layer. According to the present invention, the small molecules of the humectant may include, but not limited to, at least one of phytantriol, erythritol, sorbitol, glucose, fructose, sodium-2-pyrrolidone-5-carboxylate, hyaluronic acid, hydroxyethyl urea, hydroxypropyl bis-hydroxyethyldimonium chloride, polyquaternium-71, other chemical compounds with multiple hydroxyl, amine, amide, acid, urea, quaternary amine, ether group, or a combination of the above compounds.

In another aspect, the humectant may comprise chemical compounds that are capable of forming hydrogen bonds with water, such as sugar polyol. In a preferable embodiment, the sugar polyol may include polymer polyol or glycerol. However, other common products of sugar polyol which have been used widely may also be suitable as the additive of the dielectric layer. When humectant is used as an additive of the material of the dielectric layer, the moisture contained in the dielectric layer can be locked much solidly because many hydrogen bonds are formed between the humectant and waters. Through this strong affinity, the change of the moisture content in the dielectric layer can be reduced when the environmental temperature and humidity change, and therefore the electrical properties of the dielectric layer and other layers of the display will be more stable. After the above-mentioned small molecules of humectant with high polar group density are used as additive, the resistivity of the dielectric layer can be decreased by 1 to 2 orders of magnitude with less than 15% loading, such that the power for providing the display electric field can also be saved.

Besides the above-mentioned additives, the composition of the dielectric layer may include other compounds, such as polymer, but not limited thereto. Preferably, the weight concentration of the polymer in the composition of the dielectric layer is about 90%, and the weight concentration of the above-mentioned humectant in the composition of the dielectric layer is about 10%. For comparing the effect of the material or composition of the dielectric layer with the additives disclosed in the present invention, two examples are described as the following.

Example 1

Preparation of Dielectric Sealing Composition without Humectant 67.2 g of Wicobond383-03 (Chemtura, USA), 1.26 g of Dynol 604 (Air Products, USA), 35.6 g of DI water, 178.5 g of CM318 (Kuraray, Japan) 22 wt % aqueous solution, and 14.2 g of XL701 (Picassian, USA) 50 wt % aqueous solution were stirred thoroughly for 1 hour and debubbled by a centrifuge at 2000 rpm for about 30 minutes. The first dielectric composition S1 for the sealing layer 16 is obtained.

Example 2

Preparation of Dielectric Sealing Composition with Humectant of the Present Invention 67.7 g of Wicobond383-03 (Chemtura, USA), 14.8 g of Dynol 604 (Air Products, USA), 20.5 g of hydroxyethyl urea (Akzonobel, USA) 48 wt % aqueous solution, 180 g of CM318 (Kuraray, Japan) 22 wt % aqueous solution, and 15 g of XL701 (Picassian, USA) 50 wt % aqueous solution were stirred thoroughly for 1 hour and debubbled by a centrifuge at 2000 rpm for about 30 minutes. The second dielectric composition S2 for the sealing layer 16 is obtained.

The above dielectric compositions S1 and S2 are respectively coated on the ITO side of an ITO/PET (polyethylene terephthalate) film and then dried at 100° C. for 2 minutes to obtain a sealing material layer with a thickness of 17 micrometers. Then, the coated films are laminated onto the ITO side of another ITO/PET film by a laminator at 120° C. and a linear speed of 20 cm/min respectively. The resistivity measurement is conducted by KEITHLEY PICOAMMETER 6485 at 15V. The resistivity of the first dielectric composition S1 is measured to be $1.3 \times 10^{11}$ ohm·cm, and the resistivity of the second dielectric composition S2 was measured to be $4.26 \times 10^9$ ohm·cm. As a result, the resistivity of the second dielectric composition S2 with the humectant is less than that of the first dielectric composition S1 without humectant by 1 to 2 orders of magnitude.

In conclusion, humectant is used as an additive in the composition of the dielectric layer, such as the sealing layer, the adhesive layer, and the micro-cup structure, for maintaining the electrical properties constant of the display according to the present invention. The used additive can be any commonly used or available humectant with small molecular weights and with high polar group density. Since the humectant can form an affinity, such as hydrogen bonding, to reserve the moisture within dielectric layer more solidly to resist the environmental temperature changes, the electrical properties of dielectric layers may become more stable under the different temperature. Furthermore, owing to good mobility and low intrinsic resistivity of those small molecules of the humectant, the moisture and temperature sensitivity of the dielectric layers with those additives are also reduced greatly, leading to improved stability of the display.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display, comprising:
   a display medium layer; and
   a dielectric layer disposed at a side of the display medium layer, and a composition of the dielectric layer comprises at least a humectant, wherein the humectant comprises chemical compounds that are capable of forming hydrogen bonds with water and includes small molecules with high polar group density, and the small molecules are at least one of phytantriol, sorbitol, fructose, sodium-2-pyrrolidone-5-carboxylate, hyaluronic acid, hydroxyethyl urea, hydroxypropyl bis-hydroxyethyldimonium chloride, and polyquaternium-71 or a combination of the above compounds.

2. The display of claim 1, wherein molecular weight of each of the small molecule is less than about 1000.

3. The display of claim 2, wherein the molecular weight of each of the small molecule has a range from about 50 to about 200.

4. The display of claim 1, wherein the humectant comprises sugar polyol.

5. The display of claim 4, wherein the sugar polyol comprises at least one of polymer polyol and glycerol.

6. The display of claim 1, wherein the dielectric layer comprises at least one of a sealing layer and an adhesive layer.

7. The display of claim 6, further comprising a substrate disposed at a side of the display medium layer, and the sealing layer is disposed at a side of the display medium layer opposite to the substrate.

8. The display of claim 6, further comprising a substrate disposed at a side of the display medium layer, and the adhesive layer is disposed at a side of the display medium layer opposite to the substrate.

9. The display of claim 1, wherein the display is an electrophoresis display (EPD), and the display medium layer comprises an electrophoretic medium layer.

10. The display of claim 9, wherein the display further comprises a plurality micro-cup structures disposed within the display medium layer, and a composition of the micro-cup structures is dielectric and includes a humectant.

11. The display of claim 1, wherein the dielectric layer further comprises at least a polymer.

* * * * *